Sept. 15, 1936.  M. J. ELDREDGE  2,054,694
BUILDING CONSTRUCTION
Filed Feb. 9, 1935
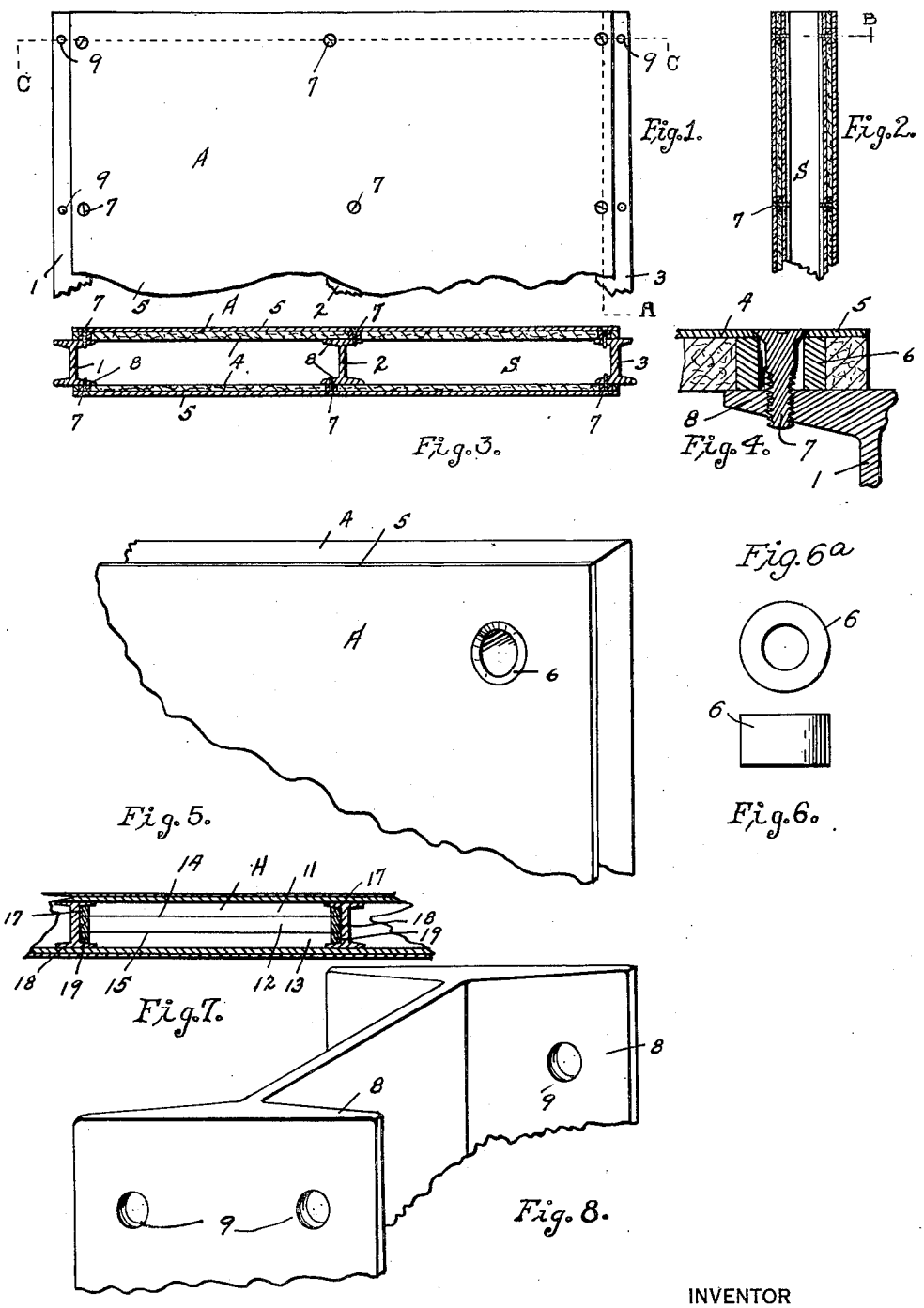
INVENTOR
Merrill J. Eldredge
BY
R. M. Thomas
ATTORNEY Patented Sept. 15, 1936

2,054,694

UNITED STATES PATENT OFFICE 2,054,694

BUILDING CONSTRUCTION

Merrill J. Eldredge, Salt Lake City, Utah

Application February 9, 1935, Serial No. 5,745

4 Claims. (Cl. 189—34)

My invention relates to building construction and has for its object to provide a new and efficient building method and structure which will provide an insulated, steel constructed building at small cost.

A further object is to provide a building construction made of I-beams having sheets of insulating material and sheets of metal secured thereto with the metal on the outside of each face.

A still further object is to provide a sectional roof, side wall, ceiling, or floor constructed of separate panels of I-beams secured together and spaced by sheets of insulation and sheets of metal with the metal surfaces outside on either face of the panel and with suitable means provided for joining the panels together.

These objects I accomplish with the device illustrated in the accompanying drawing in which similar numerals and letters of reference indicate like parts throughout the several views and as described in the specification forming a part of this application and pointed out in the appended claims.

In the drawing

Figure 1 is a face view of one end of a panel.

Figure 2 is a section on line A of Figure 1.

Figure 3 is a section on line C—C of Figure 1.

Figure 4 is a section on line B of Figure 2 showing the section enlarged to show the construction of a portion of the I-beam with the insulation and metal secured thereto.

Figure 5 is a perspective view of one corner of one of the panels enlarged.

Figure 6 is a face and end view of one of the spacer sleeves used in the insulation.

Figure 6a is a plan view of Figure 6.

Figure 7 is a sectional view of a modified form of construction in which thin sheets of highly reflective material are shown carried between the I-beams and within the space between the metal sheets or, metal sheets and insulation, on each side of the I-beam.

Figure 8 is a perspective view of an I-beam bored to receive the securing stud bolts.

My invention consists of taking I-beams 1, 2 and 3 and setting them spaced apart with panels A formed by securing sheets of insulation material 4 onto sheets of thin metal 5 and then securing the panels to the I-beams. The insulation may be any of the type of insulation wall boards, such as might be made of fuller's earth, or like material, or of a fibrous nature or with porous gypsum, or asbestos fiber and other compositions. One type of these wall boards is sold on the market under the trade name of "Celotex".

Through the insulation boards I provide spacer sleeves 6 adapted to engage the face of the flange of the I-beams and the inner face of the sheets of metal 5 to prevent the securing stud bolts or cap screws 7 from compressing the insulation board and thereby making the edge surfaces of each panel uneven. The flanges 8 of the I-beams are bored and threaded at 9 to receive the bolts 6.

As shown in Figure 4 of the drawing, the I-beams have the flanges bored and the panels of insulation board and metal are secured thereto by inserting the bolts 6 through the sleeves 5 in the insulation and the holes 4 in the metal sheets 3.

The preferable way of making the sectional panels is to set the sleeves 6 in the insulation 4 and then to secure the sheets of metal 5 to the sheets of insulation 4 by suitable adhesive or by the use of small screws or other mechanical devices.

The panels A, formed of the insulation 4 and the plates 5, are perforated by extending the bore of the sleeves 6 through the metal plate 5 in alignment therewith and the hole in the plate chamfered to fit the taper of the heads of the cap screws or bolts 7. The holes 9 through the flanges 8 are bored to align with the holes and sleeves through the panels so that the panels may be secured to the I-beams without any difficulty and construction work will be greatly accelerated.

The spaces S between the panels on each side and the I-beams are dead air spaces sealed from each other and from outside influence of air currents.

As shown in Figure 7 the dead air space H is divided into three spaces 11, 12, and 13, by sheets of very thin highly reflective material such as aluminum foil, or fabric covered with aluminum paint, or other such material.

The sheets of aluminum foil 14 and 15 are spaced apart and set between the flanges of the I-beams 16 by suitable insulation strips 17, 18 and 19.

Having thus described my invention I desire to secure by Letters Patent and claim:

1. In a building construction, the combination of sheets of insulation secured to like sheets of metal; sleeves formed through the insulation to prevent compression thereof; perforations through the metal sheet in alignment with those in the insulation; and I-beams to which the sheets are secured to form the side wall, floors, ceilings and other parts of the building.

2. In a building construction of the class described, the combination of I-beams erected to form marginal frames; sheets of metal secured to opposite flanges of said I-beams with insulation between the beams and metal to form a solid wall; sheets of very thin aluminum foil mounted from web to web of said I-beams; and means to mount and hold said foil spaced apart from each other and from the metal.

3. In a building construction of the class described, the combination of I-beams erected to form marginal frames; sheets of metal lined with sheets of insulation secured to the flanges of said I-beams; sheets of very thin highly reflective metal foil mounted from web to web of said I-beams; and means to mount and hold said foil spaced apart.

4. In a building construction, the combination of I-beams erected to form marginal frames; sheets of metal lined with sheets of insulation to be secured to the I-beams covering one half of the beam with each sheet; perforations through the flanges of the I-beams; perforations through the sheets of metal in alignment with those through the flanges of the I-beams; stud bolts to hold the metal and insulation in fixed relation to said I-beams with each abutting sheet of metal which has covered half of the I-beam to engage the next sheet of metal with a smooth outer surface parallel and in alignment.

MERRILL J. ELDREDGE.